May 31, 1960 R. I. ROTH 2,939,113

DATA STORAGE DEVICE USING ELECTRICALLY RESPONSIVE FLUID

Filed Dec. 20, 1954 3 Sheets-Sheet 1

INVENTOR.
ROBERT I. ROTH

BY

Burton P. Beatty
ATTORNEY

INVENTOR
ROBERT I. ROTH

Burton P. Beatty
ATTORNEY

DATA STORAGE DEVICE USING ELECTRICALLY RESPONSIVE FLUID

Filed Dec. 20, 1954

3 Sheets-Sheet 3

INVENTOR.
ROBERT I. ROTH

BY

Burton P. Beatty
ATTORNEY

United States Patent Office 2,939,113

Patented May 31, 1960

2,939,113

DATA STORAGE DEVICE USING ELECTRICALLY RESPONSIVE FLUID

Robert I. Roth, Briarcliff Manor, N.Y., assignor to International Business Machines Corporation, New York, N.Y., a corporation of New York Filed Dec. 20, 1954, Ser. No. 476,269

2 Claims. (Cl. 340—173)

This invention relates generally to storage devices and more particularly to improvements in the type wherein a storage circuit is established through an electrically responsive fluid.

The principal object of the present invention is to provide a compact fluid storage device wherein a plurality of columns of information can be stored.

Another object of the invention is to provide a fluid storage device including a plurality of electrodes arranged near a common conductor and in which information is represented by conductive paths being established between a plurality of the electrodes and the conductor.

A further object is to provide an improved storage device in which information is stored in a circuit formed by connecting a plurality of electrodes in series through a conductor.

Still another object is to provide a novel mechanism to read out the stored information for use in an indicating means.

Other objects of the invention will be pointed out in the following description and claims and illustrate in the accompanying drawings, which disclose, by way of examples, the principle of the invention and the best mode, which has been contemplated, of applying that principle.

Figure 4A:
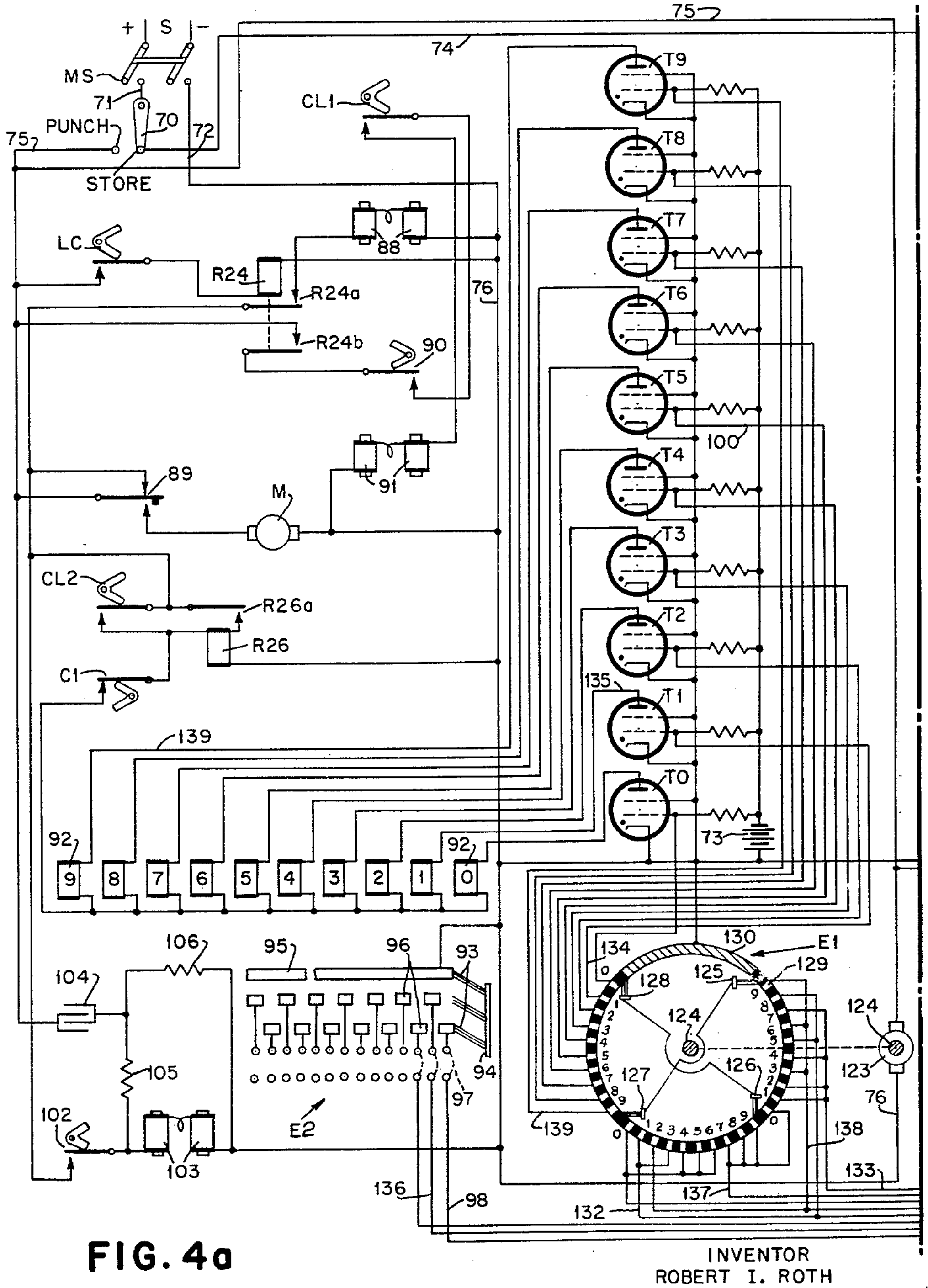
Figure 4B:
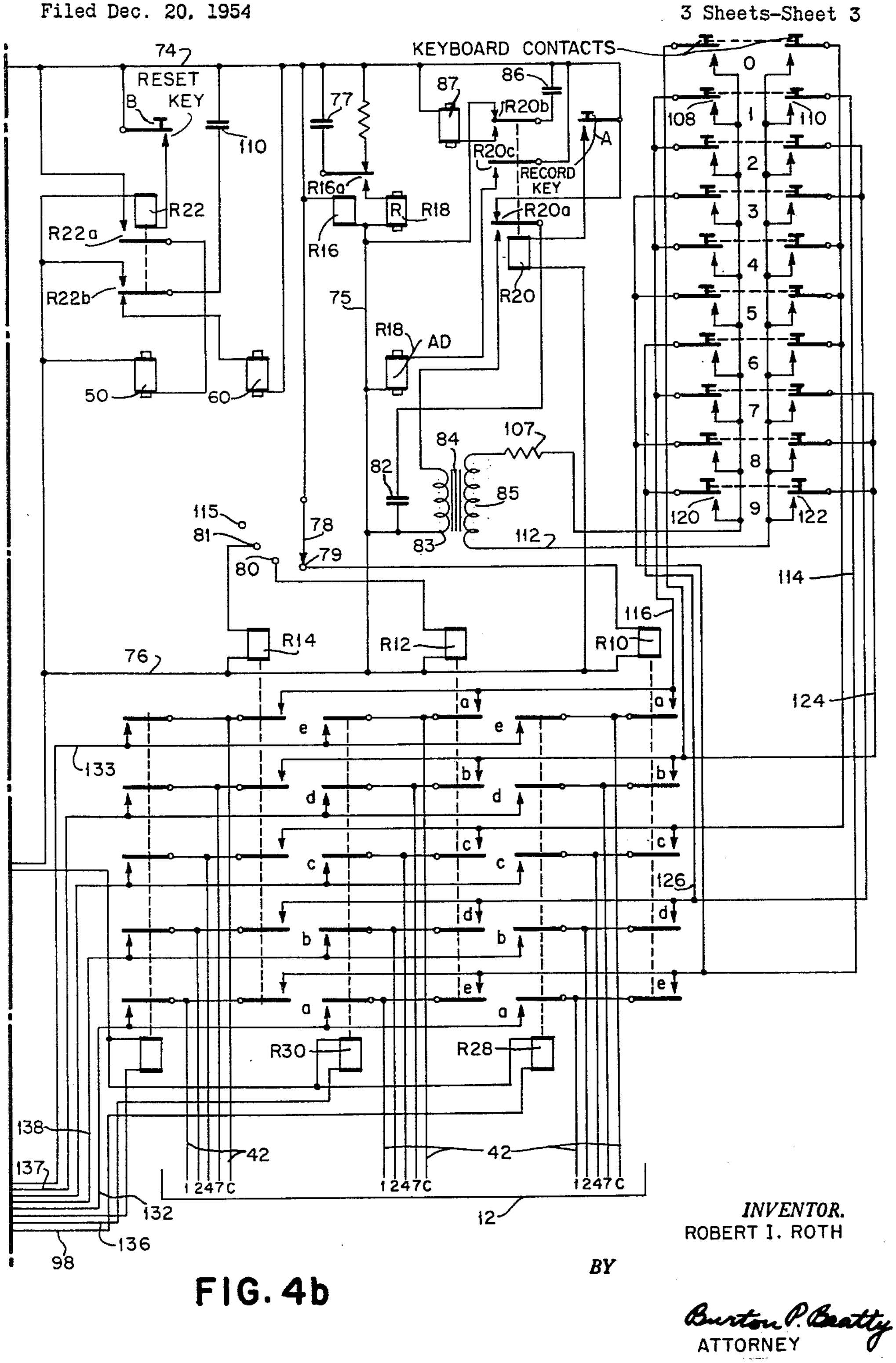

Figs. 4*a* and 4*b* taken together, comprise an electrical wiring diagram of the preferred embodiment of the invention.

In the storage device of the present invention a conductor comprising a container containing a substance having multiple electrical resistance properties consisting of a mixture of low conductivity fluid and finely divided metallic particles is positioned to receive a series of groups of electrodes representing data receiving positions for the columns of a record card. Each group includes ten electrodes which extend into the mixture in such a manner that a gap exists between each electrode and the container. Means are provided to enter data in each receiving position successively which includes means to draw particles, one against the other, to form and hold electrically conductive paths which bridge the gaps between the container and a pair of selected electrodes, whereby the selected electrodes are connected in series through the conductor. The datum stored in each position can then be read out for use in an indicating means. The stored data is erased by a mechanism which agitates the mixture to disburse the particles forming the conductive paths throughout the fluid.

Figures 1, 2, 3:
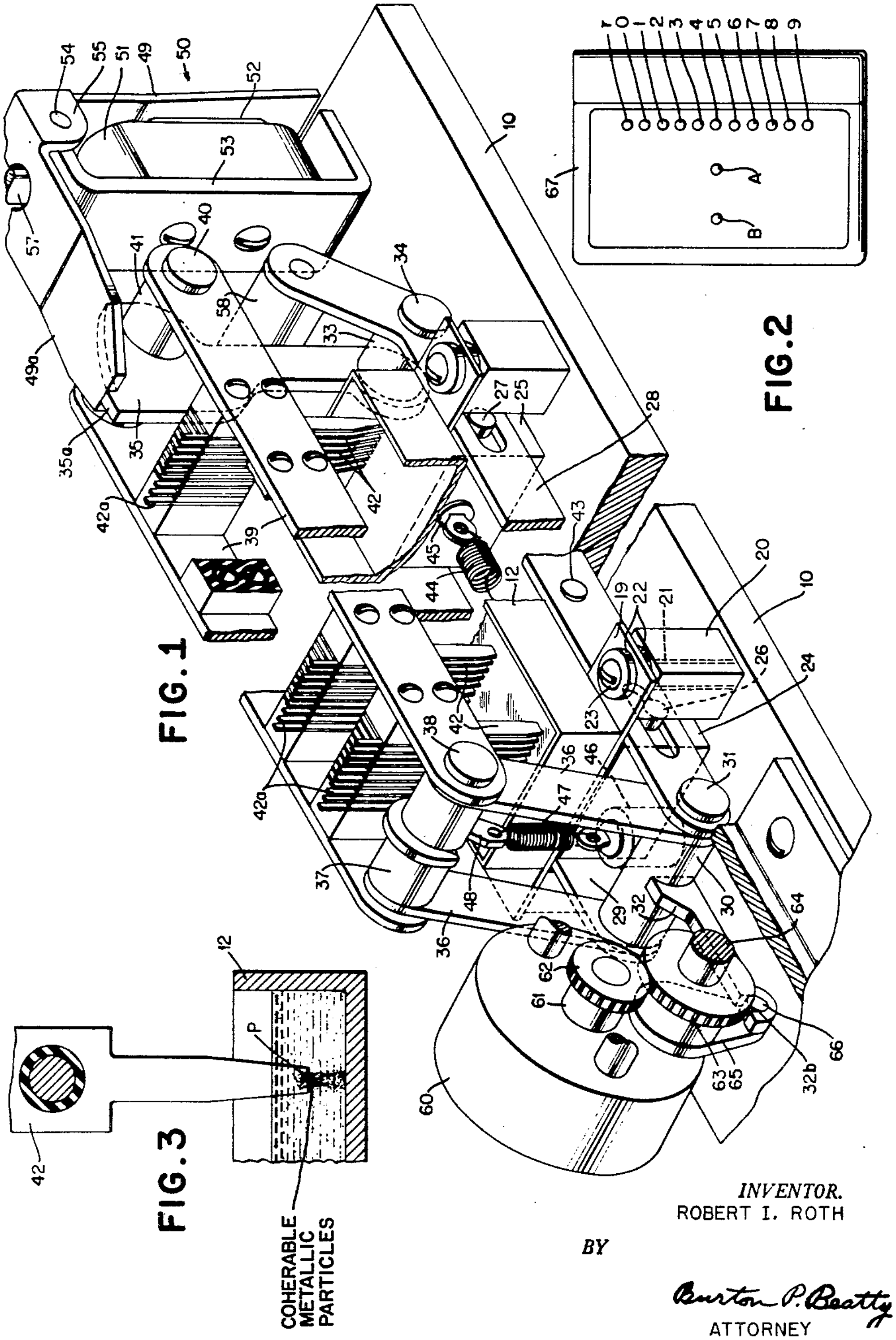
Fig. 1 is a perspective view of the storage device of the present invention and the resetting mechanism therefor showing the parts in normal storage position.
Fig. 2 is a diagrammatic view of the keyboard showing the placement of the control keys.
Fig. 3 is a detail view showing a conductive path of metallic particles extending between the spaced terminal members.

Referring to Fig. 1, it is seen that the mechanism of this invention has a base plate 10. A container 12 is mounted on support plates 19 which are in turn supported on blocks 20. This container is comprised of electrically conductive material. An insulating tube 21 extends through a clearance hole in each block 20 and through a pair of insulating washers 22 upon which each plate 19 rests. A screw 23 is passed through each washer and tube and the corresponding plate 19 to secure the entire container unit to the base plate 10. In this manner the container 12 is rigidly supported by and insulated from the base plate 10. The container is provided with a mixture of tricresyl phosphate and finely divided iron powder for a purpose which is explained later. However, other finely divided metallic particles and insulating oils can be used.

Fastened to the base plate 10 are blocks 24 and 25 (Fig. 1), each of which carries a pair of pins 26 and 27, respectively. These pins extend a short distance from the side surfaces of blocks 24 and 25 (Fig. 1). Slides 28 and 29 are mounted for reciprocation on pins 26 and 27 through elongated slots. A cylindrical member 30 is pivotally connected to the left hand ends of slides 28 and 29, as viewed in Fig. 1, by means of pivot pins 31. Secured to the cylindrical member 30 is a drag link 32 whose function will be explained hereinafter. A cylindrical member 33 is pivotally connected to slides 28 and 29 near their right hand ends by pivot pins 34. Integrally connected with the cylindrical member 33 is a latch 35, having a ridge portion 35*a*. A pair of links 36 is pivotally mounted on pins 31 and are connected at their upper ends by a cylindrical member 37. A pair of pins 38 pivot together the ends of member 37 and the left hand ends of a pair of horizontal links 39. The right hand ends of links 39 are pivotally connected by pivot pins 40 to a cylindrical member 41 which is integral with the upper portion of latch 35.

The horizontal links 39 are positioned above the container 12 and support between them a series of groups of electrodes 42. Each group is composed of ten electrodes 42. However, only five electrodes are required to store a number from 0 to 9, so each group of ten electrodes can store two columns of information. The electrodes 42 are mounted in the usual contact pile-up manner between links 39 to insulate them from the links. Each electrode 42 is provided with a lug portion 42*a* to which a lead wire can be connected. In Fig. 1 the electrodes 42 are shown extending downwardly into the iron-oil mixture in the container. A gap to be utilized as a conductive path exists between the lower end of each electrode and the upper surface of the container. Each electrode is one terminal member of a coherer and the container is the other terminal. The iron powder in the iron-oil mixture is the granular conductor between the electrodes which conducts electricity when the coherer is cohered.

Extending between the slides 28 and 29 is a rod 43 to which is attached one end of a coil spring 44. The other end of spring 44 is anchored on a screw 45 which is threaded into the block 25. This spring urges slides 28 and 29 to the right, as viewed in Fig. 1, and cylindrical member 30 against a stop 46 which projects upwardly from the base plate 10. A coil spring 47 extends between the stop 46 and a spring hook 48 which is fitted over the cylindrical member 37. This spring urges the links 36 in a clockwise direction about pivot pins 31. The horizontal links 39 are in turn urged to the right to hold the ridge 35*a* of latch 35 firmly against the end of an extension 49*a* of an armature 49.

The armature 49 is actuated by a magnet generally designated 50. The coil 51 of this magnet is supported by a core 52 which in turn is fastened to a yoke 53 carried by base plate 10. The armature 49 is pivotally connected at 54 to yoke 53 through a pair of outwardly projecting ears 55. A coil spring (not shown) extends between the upper portion of armature 49 and a stud 57 projecting upwardly from yoke 53. This stud extends through an opening in armature extension 49*a* which is large enough to permit movement of the armature 49 about its pivot point 54. The coil spring urges the armature in a counterclockwise direction to normally hold the end of extension 49*a* in a position to be engaged by the ridge 35*a* of latch 35.

When the magnet 50 is energized, the armature 49 is drawn toward the core 52 and moves clockwise about its pivot point 54. The armature extension 49*a* is raised away from the ridge 35*a* of latch 35, thereby permitting spring 47 to move the links 36 clockwise about pins 31, as viewed in Fig. 1, and horizontal links 39 toward the right. The movement of the links 39 causes latch 35 to rotate in a clockwise direction until it engages a stop bar 58. This bar is secured between the upturned ends of slides 28 and 29. The electrodes 42 in each group are thus moved downwardly and to the right causing their lower ends to move through the iron oil mixture in the container.

Upon completion of this motion of the electrodes 42, the drag link 32 is operated by mechanism described hereinafter, to cause slides 28 and 29 to move to the left. In moving to the left, the electrodes 42 are dragged through the iron particles which have deposited on the bottom of the container. This causes the particles to again be suspended in the oil. Since the latch 35 is now resting against the stop bar 58, the latch is moved to the left sufficiently to allow the armature extension 49*a* to drop off the latch ridge 35*a*. The magnet 50 is picked up only momentarily and is conditioned to be reset when the slides 28 and 29 begin their movement to the left. When the drag link 32 has reached the limit of its stroke, it is released to permit spring 44 to return the slides 28 and 29 to their initial position. The latch 35 moves with the slides. The ridge 35*a* is engaged by armature extension 49*a* and remains against the armature while the other parts move to the position of Fig. 1. The links 39 are moved upwardly and to the left by this action of latch 35 until the electrodes 42 are returned to their initial position.

The drag link 32 is actuated by means of a rotary solenoid 60 which is wound around a shaft 61. Fastened to shaft 61 is a gear 62 which meshes with a gear 63 freely mounted on a stud 64. An arm 65 is formed integrally with gear 63 and carries at its lower end a pin 66. This pin is adapted to rest in a notch 32*b* in drag link 32. When the solenoid 60 is energized, the shaft 61 is moved in a counterclockwise direction and carries gear 62 with it. Gear 62 moves gear 63 clockwise which carries the pin 66 to the left. Pin 66 moves the drag link 32 to the left against the action of spring 44 each time that solenoid 60 is energized.

It is thus seen that any conductive path comprised of iron particles extending between an electrode 42 and the container 12 can be broken by actuation of the resetting mechanism to disburse the particles throughout the tricresyl phosphate. In addition, since the iron particles are heavier than the oil, there is a tendency on the part of the particles to settle to the bottom of the container. Actuation of the resetting mechanism causes the settled particles to be redistributed throughout the tricresyl phosphate to insure satisfactory operation of the storage device.

The storing of information is controlled from a key column section having a casing 67 shown in Fig. 2. Mounted in the casing is a conventional key column unit. This unit has eleven keys one of which is designed *r* and is merely a release key. The other ten keys are digit keys to select digits 0 to 9. Upon depression of a digit key, it is latched down by mechanism which is shown and described in United States Patent No. 2,543,899, issued March 6, 1951 to A. H. Dickinson. The latched key may be released by depressing any other digit key in the column or by depressing the release key *r*. The key column section is provided with a solenoid 87 (Fig. 4*b*) which when energized actuates mechanism described in the aforementioned patent to release any latched digit key. This operation may be called the clearing operation.

There are two additional keys mounted in the casing 67 designated A and B, the functions of which will be explained later in the circuit description.

*Circuit diagram and operation*

Referring now to Figs. 4*a* and 4*b*, wherein the storage device of this invention is shown to control a key punch mechanism similar to that disclosed in United States Patent No. 1,962,750 issued on June 12, 1934 to H. L. Read. It is to be understood that the storage device is not limited to use with a key punch but can be used in conjunction with other well known accounting machines where it is desired to store information for subsequent use in any accounting procedure. A source of current supply is shown at S in Fig. 4*a* and power from the source is made available for machine operations by the closing of a master switch MS. A double throw switch 70 when moved to the store position conditions the circuits to permit entry of information in the storage device and when moved to the punch position conditions the circuits to allow the information in storage to be punched into a record card.

In Fig. 4*b* the container 12 is shown with only three groups of five electrodes 42 extending into it to illustrate the operation of the storage device. The electrodes in each group are designated 1, 2, 4, 7 and *c*. A relay is provided in each order, these relays being designated R10, R12, and R14, and when energized connect the electrodes 42 associated with the container in their respective orders to the contacts controlled by the keyboard keys 0–9 through their contacts *a* to *e*.

The storage device of this invention operates on the principle that conductive paths must be established between two electrodes in a group of five and the common container 12 to connect the selected electrodes in series through the conductive container. The numerical value of the numbers stored is the sum of the values associated with the selected electrodes. There is one exception to this storing scheme as shown hereinafter. For example, a 1 is stored by causing conductive paths to be established between the electrode designated "1" and the container 12 and between the electrode designated "*c*" and the container 12. A 3 is recorded by establishing conductive paths between the electrodes "1" and "2" and the container 12. A 9 is stored by establishing conductive paths between the electrodes "2" and "7" and the container 12. The one exception to the general scheme is the numerical value 0, which is recorded by establishing conductive paths between the electrodes "4" and "7" and the container 12.

The voltages supplied by the source S are shown in Fig. 4*a* where lines 71 and 72 are at 110 and 0 volts, respectively. Also, a battery 73 provides 22½ volts to the control grid of each of a series of electronic tubes designated T0 to T9. These voltage values are given only by way of example. It is to be understood that any suitable voltage values may be employed. The tubes T0–T9 are of the thyratron type, each having a screen grid and a control grid.

With the switch 70 (Fig. 4*a*) moved to the store position, a relay R16 (Fig. 4*b*) is energized through a circuit as follows: From line 71 through switch 70, wire 74, coil of relay R16, wires 75 and 76 to line 72. The relay contacts R16*a* are transferred to complete a circuit from line 71 through condenser 77 and the reset coil R of stepping relay R18 to line 72. The reset coil is energized momentarily while condenser 77 charges.

This energization causes the contact wiping arm 78 of relay R18 to return to its initial position on the first contact segment 79. A circuit is then completed through arm 78 and segment 79 to the coil of relay R10 which upon energization closes its contacts R10*a* to R10*e*, inclusive. The five electrodes 42 associated wtih this first order are thus connected to the contacts controlled by the keyboard keys 0–9 and the storage device is ready to receive information. It should be noted that each keyboard key controls two normally open contacts.

The desired key 0–9 (Fig. 4*b*) is now depressed and is held down by the latching mechanism shown in the previously mentioned United States Patent No. 2,543,899. A record key A is then depressed and upon closure of its contacts a circuit is established from line 71 and wire 74 through the coil of a relay R20 to line 72. A condenser 82 is connected between lines 71 and 72 and is therefore charged. The energization of relay R20 causes its contacts to transfer to cause the condenser 82 to discharge through the primary coil 83 of a transformer 84. A high voltage pulse is thus induced in the transformer secondary coil 85. This pulse is applied across a pair of electrodes 42 in the first order and the container 12 through the related key contacts which have been closed by depression of one of the keys 0–9. The iron particles in the mixture distributed in container 12 are aligned and drawn into contact, one against the other, to provide conductive paths between the selected electrodes 42 and the container. In the present instance the lower end of each electrode is spaced approximately .025 inch from the upper surface of the container. In order to insure reliable operation by establishing and holding conductive paths which bridge the gaps between the pair of electrodes and the container, a pulse of 300 volts or more must be applied across the terminals. In this regard it must be noted that each electrode is required to be spaced a greater distance from its adjacent electrode than the lower end of the electrode is spaced from the container. The conductive path P thus formed is shown in Fig. 3.

For example, if the 1 key were depressed, the high voltage pulse would establish the following circuit: From one side of coil 85, through the wire 112, closed contacts 110 of the 1 key, wire 114, relay contacts R10*e* (now closed), the "1" electrode 42, container 12, the "*c*" electrode 42, relay contacts R10*a* (now closed), wire 116, closed contacts 108 of 1 key, resistor 107 to the other side of coil 85. The conductive paths continue to exist after the duration of the pulse and until the mixture is agitated by the mechanism described hereinbefore.

A condenser 86 is connected between lines 71 and 72 and is therefore charged. The relay contacts R20*b* are also transferred when relay R20 is energized to cause the condenser 86 to discharge through solenoid 87. The energization of this solenoid actuates mechanism to release the depressed key and open the related key contacts. The mechanism controlled by solenoid 87 is shown in United States Patent No. 2,543,899. It is understood that the pulse from condenser 82 to the electrodes 42 occurs before the key contacts are opened by the pulse from condenser 86.

The relay R20, when energized, closes its R20*c* contacts to complete a circuit through the advance coil AD of stepping relay R18. The relay R18 is of the type which is advanced upon deenergization of the advance coil. Accordingly, when the record key A is released, the relay R20 is dropped out and contacts R20*c* open. The circuit through AD of relay R18 is broken to deenergize this coil. The wiping arm 78 is advanced to the second contact segment 80, thus causing relay R10 to drop out and relay R12 to pick up. The relay contacts R20*a* and R20*b* also transfer back to their initial positions to allow condensers 82 and 86 to again become charged.

In the instance where a "9" is to be recorded in the next column, the contacts 120 and 122 are closed when the 9 key is depressed. The high voltage pulse induced in the secondary winding 85 of transformer 84 will pass through wire 112, the closed contacts 122 of the 9 key, wire 124, relay contacts R12*b* (now closed), the "7" electrode 42, container 12, the "2" electrode 42, relay contacts R12*d* (now closed), wire 126, closed contacts 120 of the 9 key, resistor 107 to the other side of coil 85. In this manner, conductive paths will be established in this order between the "2" electrode 42 and the container 12 between the "7" electrode 42 and the container. This storage circuit represents the numeric value 9. When the record key A is released, the wiping arm 78 is advanced to the third contact segment 81, thus causing relay R12 to drop out and relay R14 to pick up and the relay contacts R20*a* and R20*b* again transfer back to their initial positions to allow condensers 82 and 86 to again become charged. It is readily seen that a numeric value can be stored in the next order in a similar manner. Upon completion of storage in the third group of electrodes 42, the wiping arm 78 advances to an idle contact segment 115.

It is thus apparent that information can be stored column by column by operation of the keys 0–9 and the record key A. When the storage operations are completed, the switch 70 is moved to the punch position. This permits the last order control relay which was energized, to drop out along with relay R16.

When it is desired to erase information in storage, the reset key B is depressed to pick up a relay R22. The relay contacts R22*a* close to complete a circuit through the coil of the latch magnet 50 and contacts R22*b* transfer to connect a condenser 110 between lines 71 and 72. When the key B is released, the relay R22 is dropped out and its *a* and *b* contacts return to their initial positions. The condenser 110 then discharges through the coil of the solenoid 60 and magnet 50 is deenergized. The momentary energization of this solenoid 60 causes the iron oil mixture to be agitated by the resetting mechanism as set forth in the mechanical description.

The punch mechanism shown in Fig. 4*a* is the well known duplicating key punch disclosed in the aforementioned United States Patent No. 1,962,750. For purposes of this description only those devices are included which are necessary to a clear understanding of the present invention. For a detailed description of the mechanisms which actuate the devices described herein, reference should be made to the patent. In this punch, the card carrier is positioned in the last column position at the start of machine operation and the contacts LC are closed to energize a relay R24 through a circuit as follows: From line 71 through switch 70, wire 75, contacts LC, relay R24 to line 72. The energization of relay R24 closes its "*a*" contacts to complete a circuit to a stacker magnet 88 as follows: From line 71, through switch 70, wire 75, latch contacts 89 (normal), relay contacts R24*a*, coils of stacker magnet 88 to line 72.

The energization of magnet 88 causes the card to be ejected and flipped over into the machine stacker causing closure of the auto-start contacts 90. The "*b*" contacts of relay R24 are also closed by its energization and a circuit is completed through a clutch trip magnet 91 when the auto-start contacts 90 are closed by the ejector arm as follows: From line 71, through switch 70, wire 75, relay contacts R24*b*, contacts 90, magazine card lever contacts CL1 (now closed) coils of magnet 91 to line 72. The energization of magnet 91 causes latch contacts 89 to transfer to complete a circuit through the motor M. The motor then drives the card feeding mechanism to cause a blank card to be moved from the magazine to the punching station. At the end of this card feeding cycle the contacts 89 are restored to normal position and the circuit to motor M is interrupted. The card at the punching station closes the card lever contacts CL2 to establish a circuit through the coil of a relay R26. This relay closes its "a" contacts to provide a holding circuit through this relay. The cam contacts C1 are the usual circuit breaker contacts and are closed when a card column is in position to be punched. These contacts permit circuits to be established to the duplicating magnets 92. Contacts C1 are opened as a card moves from one column punching position to another column punching position.

From Fig. 4a it is seen that the series of thyratron tubes designated T0–T9 have their cathodes connected to line 72. The control grid of each tube has a substantially fixed voltage applied thereto by battery 73 to maintain each tube in a non-conductive state. The positive side of battery 73 is connected to line 72 and the negative side of this battery extends to the grids of tubes T0–T9 through the grid resistors associated with each tube. These tubes T0–T9 are made conductive to effect the energization of the duplicating magnets 92.

When the switch 70 is moved to the punch position, a motor 123 is connected across lines 71 and 72. The motor 123 drives a shaft 124 of an emitter E1. This shaft carries two pairs of wiper brushes 125, 127 and 126, 128. The brushes 125 and 127 are electrically connected to one another and positioned 180° apart. The brushes 126 and 128 are similarly connected and positioned, and fixed 90° from each of the brushes 125 and 127. The ring of the emitter E1 is provided with three groups of contact segments marked 0–9, each segment being designated 129. A common segment 130 of conducting material is connected to wire 76 which is at ground potential. It is readily seen that when shaft 124 is rotated slightly counterclockwise from the position shown in Fig. 4a, the brush 125 will be in contact with the common segment 130, brush 128 will be in contact with the 0 segment of the left hand group of segments 129, brush 127 will be in contact with the 0 segment of the lower group of segments 129 and brush 126 will be in contact with the 0 segment of the right hand group of segments 129. As the shaft 124 continues its rotation, the brushes 128, 127 and 126 will move in succession over the segments numbered 0–9 of the three groups of segments 129 and at any one instant these brushes will be on the same segment in each group. After shaft 124 is rotated 90°, the brush 126 will be in position to wipe the common segment 130 and brushes 125, 128 and 127 will move over the segments 129 in the three groups.

A trio of contact wiper brushes 93 (Fig. 4a) are carried by an arm 94 and are electrically connected to one another. The upper most wiper brush 93 is adapted to contact a common strip of conducting material 95 while the lower two alternately contact insert segments 96, all of which segments and strip comprise an emitter E2. The horizontal spacing between segments 96 corresponds to the columnar spacing of the record card in the punching machine and as the card is advanced step by step, the brushes 93 will advance in a similar manner to successively cooperate with the several segments 96 connecting each in turn with the common strip 95.

In order to punch the information stored in the storage device by depression of the 1 key, the 1 magnet 92 must be energized. For example, when the information is to be punched in column 1, the brushes 93 of emitter E2 are positioned as shown in Fig. 4a. A circuit will then extend from wire 76 through emitter strip 95, through brushes 93, wire 98, relay R28 to wire 75. The energization of rely R28 closes its normally open contacts *a* through *e* (Fig. 4b) to condition the contact segments of emitter E1 to represent the information stored in column 1. Conductive paths have already been established between the "1" electrode 42 of the first order group and the container 12 and the "*c*" electrode 42 and container 12, as previously described in connection with the storing of information in the first order. At one point in a revolution of the shaft 124, a brush of emitter E1 will be in contact with the 1 segment of each group of segments 129 and a brush will also be in contact with the common segment 130. Let us assume that the brush 125 is in contact with the common segment 130 and brush 128 is in contact with the 1 segment of the left hand group, brush 127 is in contact with the 1 segment of the lower group and brush 126 is in contact with the 1 segment of the right hand group. A circuit will then be completed from wire 76 through common segment 130, brush 125, brush 127, the 1 segment of the lower group, wire 132, relay contacts R28*a* (now closed), "1" electrode 42, container 12, "*c*" electrode 42, relay contacts R28*e* (now closed), wire 133, the 1 segment of the right hand group of segments 129, brush 126, brush 128, the 1 segment of the left hand group, wire 134 to the control grid of thyratron T1. The grid is thus brought to cathode potential and the tube T1 is rendered conductive to energize the 1 magnet 92 through the following circuit: From line 71 through switch 70, wire 75, contacts 89 (normal), contact R26*a* (now closed), cam contacts C1, coil of 1 magnet 92, wire 135 to the plate of tube T1, cathode of tube T1, wire 76 to line 72. When this magnet is energized, the usual mechanism is actuated to effect punching in the card at the punching station. After the card has been punched, the contacts 102 are opened in the manner shown in the above patent to deenergize the punch magnets 103. The same action causes the cam contacts C1 to open to interrupt the circuit through the 1 magnet 92 and associated thyratron T1. In this manner thyratron T1 is quenched. A condenser 104 and resistors 105 and 106 are placed in circuit with the magnet 103 and contacts 102 to limit the arcing across contacts 102 when they are opened. During the time that the armature of the punch magnet is being attracted to cause punching on the card, the shaft 124 may rotate at sufficient speed to complete the circuit traced above several times from ground potential to the grid of thyratron T1. This will not affect the operation of the thyratron since it can only conduct when the circuit to its grid is completed the first time and it will remain conducting until the cam contacts C1 are opened to interrupt the current through the thyratron.

The card then escapes to the next column to be punched and the arm 94 of emitter E2 is moved to the segment 96 of the corresponding column, so that the proper brush 93 can contact the segment. In the next punching position the brush 94 of emitter E2 will establish a circuit from wire 136 which is at ground potential through the coil of a relay R30 to wire 75. The energization of relay R30 closes its normally open contacts *a* through *e* (Fig. 4b). Conductive paths have already been established between the "2" electrode 42 of the second group and the container 12 and between the "7" electrode 42 and container 12 as previously described. In this instance, let us asume that the brush 125 is in contact with the common segment 130 and brush 128 is in contact with the 9 segment of the left hand group, brush 127 is in contact with the 9 segment of the lower group and brush 126 is in contact with the 9 segment of the right hand group. A circuit will then be completed from wire 76 through common segment 130, brush 125, brush 127, the 9 segment of the lower group, wire 137, relay contacts R30*d* (now closed), "7" electrode 42, container 12, "2" electrode 42, relay contacts R30*d* (now closed), wire 138, the 9 segment of the right hand group of segments 129, brush 126, brush 128, 9 segment of the left hand group, wire 139 to the control grid of thyratron T9. The grid of this thyratron is brought to cathode potential and the tube is rendered conductive to energize the 9 magnet 92 through a circuit as follows: From line 71 through switch 70, wire 75, contacts 89 (normal), contact R26*a* (now closed), cam contacts C1, coil of 9 magnet 92, wire 139 to the plate of tube T9, cathode of tube T9 to line 72. When this magnet is energized, the punching mechanism is actuated as before to effect the punching of the card in the 9 position. When the cam contacts C1 are opened, the thyratron T9 is quenched in a similar manner to thyratron T1. The card then escapes to the next column to be punched and the arm 94 of emitter E2 is again moved to the proper segment 96.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a storage device; a conductive surface comprising a container having a single mixture of low conductivity fluid and finely divided metallic particles; a plurality of electrodes extending into said mixture, each of said electrodes defining a gap through said mixture to said conductive surface of said container; said container being normally electrically isolated from said storage device; means for entering a single value into said device by concurrently connecting a selected pair of electrodes in series through said conductive surface including means for drawing metallic particles one against another between each of a pair of selected electrodes and said conductive surface to form and hold a series electrical circuit between one of said selected electrodes, said conductive surface, and said other of said selected electrodes.

2. In a decimal storage device; a column of settable keys representing decimal digits; a pair of open contacts operable by each key; the contacts associated with each key being closed when a selected key is set; a single mixture of low conductivity fluid and finely divided metallic particles; a container having an electrically conductive interior surface in which said mixture is contained, said container being electrically insulated from said decimal storage device; only five storage electrodes extending into said single mixture, each of said five electrodes defining a gap through said mixture to said electrically conductive surface of said container; means for entering a decimal digit into said device, including means for providing a high voltage impulse concurrently through the closed contacts of a selected key and across the gaps defined by two of said five electrodes to draw and hold electrically conductive paths which bridge the gaps between said two electrodes and said container to form an electrical series circuit; said electrical series circuit formed between one of said two electrodes, said conductive surface, and said other of said two electrodes being indicative of the decimal digit represented by said selected key.

References Cited in the file of this patent

UNITED STATES PATENTS

| | | |
|---|---|---|
| 1,155,653 | Gill | Oct. 5, 1915 |
| 1,201,034 | Gill | Oct. 10, 1916 |
| 2,770,796 | Boer | Nov. 13, 1956 |
| 2,810,900 | Johnson | Oct. 22, 1957 |
| 2,889,539 | Roth | June 2, 1959 |

FOREIGN PATENTS

| | | |
|---|---|---|
| 197,503 | Great Britain | May 17, 1923 |

OTHER REFERENCES

The Design of Switching Circuits, by W. Keister et al., N.Y., 1951, pp. 307–315 relied on.

A publication entitled "Quarterly Report No. 3 of the Computer Components Fellowship No. 347," published by the Mellon Institute of Industrial Res., July 11, 1951, (pgs. III–3 to III–5 and Fig. III–3 relied upon).